Reissued Nov. 22, 1938

Re. 20,926

UNITED STATES PATENT OFFICE 20,926

PURIFICATION OF TRINITROTOLUENE

Joseph A. Wyler, Allentown, Pa., assignor to Trojan Powder Company, a corporation of New York No Drawing. Original No. 2,126,162, dated August 9, 1938, Serial No. 76,434, April 25, 1936. Application for reissue September 12, 1938, Serial No. 229,569

4 Claims. (Cl. 260—645)

My invention relates to improvements in the purification of trinitrotoluene, and more particularly relates to improved means of reconditioning trinitrotoluene that has deteriorated as a result of long storage, or that has deteriorated as a result of admixture with contaminating materials. The principal object of my invention is to provide a means for treating trinitrotoluene recovered from shell or other ordnance material, or recovered from amatol or other explosive compositions, for the production of trinitrotoluene from such salvaged material equal in quality to newly manufactured trinitrotoluene of the customary standard grades.

Efforts have been made in the past to purify salvaged or recovered trinitrotoluene obtained by the steaming of shells, or obtained by the treating of amatol with hot water or steam, by the customary methods of purification of trinitrotoluene by crystallization or washing with solvents such as alcohol, carbon tetrachloride, or mixtures of one or both of these materials with other solvents such as ethylene dichloride, etc., but it has been found that the purified trinitrotoluene so obtained was darker in color than standard trinitrotoluene, while the loss of material in the purifying process was also greater than is the case when newly manufactured trinitrotoluene is purified by corresponding processes.

I have discovered that among the impurities present in trinitrotoluene that has been stored for a very long time in the presence of deteriorating materials, and particularly in the trinitrotoluene recovered from salvaged shells and from amatol recovered from salvaged shells and bombs, there are certain highly colored materials which can only be separated with great difficulty from the trinitrotoluene by any of the purification methods now known, and which cannot be completely separated from trinitrotoluene by the decolorizing processes or refining processes commonly used in the treatment of trinitrotoluene.

I have discovered that by heating deteriorated trinitrotoluene, or trinitrotoluene the purity or quality of which has been impaired by either contamination with shellac or other impurities taken up from the shell, or by the presence of degradation products of the trinitrotoluene or of reaction products of trinitrotoluene and ammonium nitrate from amatol, to a temperature above its melting point in the presence of a relatively small quantity of a mixture of sulfuric acid and nitric acid, or preferably a mixture of sulfuric acid, nitric acid and water, in an amount insufficient to dissolve the trinitrotoluene being treated, that the color of the trinitrotoluene so treated is greatly improved through the colored materials preferentially going into the acid solution.

This unexpected result is apparently due to the coloring materials being more soluble in a mixture of sulfuric acid and nitric acid than they are in molten trinitrotoluene, and my experiments have indicated that this preferential solubility of the highly colored impurities in trinitrotoluene is in part a factor of the composition of the acid mixture used as the solvent liquid, certain acid mixtures possessing materially greater preferential solvent action than others.

Although I have found that sulfuric acid alone has little or no selective solvent action upon the coloring and deteriorating materials present in salvaged trinitrotoluene, I have found that sulfuric acid in the presence of as little as .3% of nitric acid possesses marked solvent action for the highly colored impurities of deteriorated trinitrotoluene, and in general I have found that I may employ in the practice of my invention any acid mixture which contains more than 70% of sulfuric acid and more than .3% of nitric acid and less than 30% of water, and although any acid mixture within this preferred range may be employed in the practice of my present invention, I find that acid mixtures containing from 70% to 99.7% of sulfuric acid and containing from .3% nitric acid to 15% nitric acid, and containing from 0% water to 15% water give the best results, and my preferred acid mixture is one containing 95% of sulfuric acid, 2% of nitric acid and 3% of water.

In this specification, and in the claims, I will use the term "deteriorated trinitrotoluene" to refer to trinitrotoluene the quality of which is reduced or impaired by the presence of highly colored bodies, without limiting myself to the source from which such highly colored bodies have been derived. I have found that trinitrotoluene that has deteriorated in quality by exposure to strong light, or by long storage, or by contact with metals, or by reaction with ammonium nitrate, or by admixture with certain materials such as shellac, may be treated successfully by my invention, and accordingly, although my invention is primarily adapted to the treatement of salvaged trinitrotoluene, by which is meant trinitrotoluene which has been recovered from loaded shells, it is to be understod that my invention is broader than the mere treatment of trinitrotoluene that has been recovered from shells or bombs, and that manufactured and stored deteriorated trinitrotoluene that has not been thus recovered from amatol mixtures or from loaded shells may be treated by my invention, and may, thereby be renovated or improved in color and in quality.

Although the principal object of my invention is to improve the color of deteriorated trinitrotoluene, I have discovered that most of the materials which impart a high color to trinitrotoluene also have deleterious effect upon its melting point and, accordingly, my process brings about an improvement in the quality of the trinitrotoluene which is treated, in addition to the improvement in the color of the treated material.

I wish to point out that the decolorizing and purifying action of the acid mixtures which I employ is not the result of the solvent action of the acid mixtures on trinitrotoluene, as is the case in certain earlier described methods for the purification of trinitrotoluene, but in the case of my present invention is the result of a selective extractability of the acid mixture for the colored materials in the trinitrotoluene, perhaps also combined with some slight oxidizing action which also tends to reduce the color of some of the contaminating impurities.

My invention is distinguished from the process of Gärtner as described in D. R. P. 382,459 in that my acid mixture serves as an extraction agent for the coloring material in molten but undissolved trinitrotoluene, whereas in Gärtner's process it is impossible for the acid mixture to function as an extracting agent because his trinitrotoluene is all is solution in the acid mixture. In my process the color originally present in the trinitrotoluene passes into the acid mixture and I have found that the selective extraction ability of my acid mixtures is so great that the color of the acid layer in contact with the molten trinitrotoluene may be a deep brown to almost black and still the trinitrotoluene layer itself would possess only a very slight tinge of yellow.

In carrying out my process, I use an acid mixture containing less than 15% nitric acid, as I have found that the use of more than 15% nitric acid is accompanied by oxidative effects which lower the melting point of the separated trinitrotoluene, impart a reddish-brownish tinge and also increase the occluded acidity of the trinitrotoluene.

As an example of the practice of my present invention, I may take 100 parts of deteriorated trinitrotoluene, and place this material in a steam jacketed kettle, provided with a stirrer, and to this deteriorated trinitrotoluene I may then add 380 parts of an acid mixture consisting of 95 parts by weight of sulfuric acid, 2 parts by weight of nitric acid, and 3 parts by weight of water.

The mixture is heated at the melting point of the trinitrotoluene or higher, but to a temperature of not over approximately 150° C. and stirred for about one hour. The contents of the kettle are run into a hot separator, in which the acid solution and the trinitrotoluene form two layers. The lower layer is drawn out.

The acid layer from the separator is treated with about 1% of its weight of nitric acid and is used over again upon a fresh portion of trinitrotoluene. This reusing operation may be repeated as many as four times with uniformly good results. The used, contaminated acid mixture is then run to waste or run into a large volume of water in order to precipitate out the trinitrotoluene still dissolved in it. This precipitated trinitrotoluene is usually of unsatisfatcory color and is reworked in the same manner as is the original trinitrotoluene from which it was derived.

The trinitrotoluene layer obtained from the separation mentioned above, is the final decolorized product and it may then be further washed with water and grained in any well known manner.

The yield of finished, light yellow colored product is over 95% of theory.

It will of course be evident that the acid mixture and the details of procedure as given in the example above are stated by way of illustration only, and that my invention is not limited to the acid mixture stated, nor to the temperature indicated, nor to the particular operative details given, and accordingly no limitation should be placed upon my invention, except as are indicated in the appended claims.

I claim:

1. The process of purifying deteriorated trinitrotoluene which comprises contacting molten but undissolved trinitrotoluene with an acid mixture consisting of from 70% to 99.7% of sulfuric acid, from .3% to 15% of nitric acid and from 0% to 15% water, and thereafter separating purified trinitrotoluene from the residual acid mixture.

2. The process of purifying deteriorated trinitrotoluene which comprises contacting the trinitrotoluene in molten but undissolved condition at a temperature between 80° C. and 150° C. with an acid mixture consisting of from 70% to 99.7% of sulfuric acid, from .3% to 15% of nitric acid and from 0% to 15% water, and thereafter separating purified trinitrotoluene from the residual acid mixture.

3. The process of purifying deteriorated trinitrotoluene which comprises contacting molten but undissolved trinitrotoluene at a temperature between 80° C. and 150° C. with an acid mixture resulting from the process claimed in claim 2, and separating the purified trinitrotoluene from the resulting acid mixture.

4. The process of purifying deteriorated trinitrotoluene which comprises contacting molten but undissolved trinitrotoluene at a temperature between 80° C. and 150° C., with an acid mixture consisting of from 70%–99.7% of sulfuric acid, from 0.3% to 15% of nitric acid and from 0% to 15% water, separating the molten trinitrotoluene from the acid mixture, contacting a new portion of deteriorated trinitrotoluene with this newly formed acid mixture, while maintaining from 0.3% to 15% of nitric acid in this acid mixture, at a temperature between 80° C. and 150° C., separating the molten trinitrotoluene from the resulting acid mixture, and using these successively produced acid mixtures, while maintaining from 0.3% to 15% of nitric acid therein in successive cycles on new portions of trinitrotoluene, at a temperature of 80° C. to 150° C., and separating the molten trinitrotoluene from the resulting acid mixture in each cycle.

JOSEPH A. WYLER.